United States Patent
Veksler (10) Patent No.: US 8,572,005 B2
(45) Date of Patent: Oct. 29, 2013

(54) REPRESENTATION OF A SET OF NUMERIC VALUES IN A COMPUTERIZED ENVIRONMENT

(75) Inventor: Michael Veksler, Haifa (IL)

(73) Assignee: International Business Machines Corporation, Armonk, NY (US)

(*) Notice: Subject to any disclaimer, the term of this patent is extended or adjusted under 35 U.S.C. 154(b) by 679 days.

(21) Appl. No.: 12/639,019

(22) Filed: Dec. 16, 2009

(65) Prior Publication Data
US 2011/0145295 A1     Jun. 16, 2011

(51) Int. Cl.
*G06F 15/18*     (2006.01)

(52) U.S. Cl.
USPC ............................................................ 706/12

(58) Field of Classification Search
USPC ............................................................ 706/12
See application file for complete search history.

(56) References Cited

PUBLICATIONS

Naveh et al ("Constraint-Based Random Stimuli Generation for Hardware Verification" 2007).*
Bin et al ("Using a constraint satisfaction formulation and solution techniques for random test program generation" 2002).*
Lewin et al ("Constraint Satisfaction for Test Program Generation" 1995).*

* cited by examiner

*Primary Examiner* — Lut Wong
(74) *Attorney, Agent, or Firm* — Ziv Glazberg (57) ABSTRACT

A set of numeric values may be represented using a data structure. The data structure is a graph having a root and leaves. A route in the data structure may represent a mask that represents a set of values. A mask may represent a term in a DNF representation of numeric values. A mask may represent numeric values that correspond to limitations set by the mask, such as having a predetermined value in a predetermined digit. The data structure comprises edges and nodes, each may be associated with a label. The label may represent a portion of a mask.

12 Claims, 4 Drawing Sheets

REPRESENTATION OF A SET OF NUMERIC VALUES IN A COMPUTERIZED ENVIRONMENT

BACKGROUND

The present disclosure relates to representing numeric values in general, and to Disjunctive Normal Form (DNF) representation of Constraint Satisfaction Problem (CSP) domains in particular.

There are various techniques for generating tests that may be used for testing a target computerized system, such as software, hardware, firmware or the like. Some of those techniques utilize CSP solvers as a basis for generating tests. CSP may be used for defining a test template configured to define a test which may falsify an aspect of a target computerized system being tested. The test template may define an at least one constraint defining relation between portions of the test, such as for example writing to a memory address and reading from the same memory address or writing to a first memory address and writing to a second memory address that is relatively close to the first memory address.

A CSP Solver may use big variable domains, such as for example, represented by 32 bits, 64 bits or the like. In some cases, a constraint on the domains is utilized to limit the set of values of the domain that is represented. The constraint may be a mathematical constraint, such as represented using an equation or formula, such as for example A=B+C or A>B. The constraint may be a constraint on a portion of the bits of a variable, such as for example the ten Least Significant Bits (LSB) of A are all zeros. The constraint may be a bitwise constraint, such as A is a shifting of B by 2 bits or A is a XOR between B and C.

Test generation may use big variable domains in CSPs. The big variable domains may represent big numbers, such as 32 bit, 64 bit, 128 bit or the like. Efficient representation of the values in the domain may be required to support efficient constraint propagation.

BRIEF SUMMARY OF THE INVENTION

One exemplary embodiment of the disclosed subject matter is a data structure comprising a DNF representation of a set of values, the data structure embodied in a computer-readable media, the data structure comprising: a plurality of nodes comprising a root and a leaf; a plurality of edges, each edge of the plurality of edges connecting two nodes of the plurality of nodes; a plurality of labels, each of the plurality of labels is associated with an element selected from the group consisting of a node comprised by the plurality of nodes and an edge comprised by the plurality of edges; wherein a first label of the plurality of labels represents a group of alternative assignments to a digit representing a portion of a value comprised by the set of values; and wherein a route between the root and the leaf represents a mask grouping a portion of the set of values, the route comprises a sequence of nodes comprised by the plurality of nodes connected by connecting edges comprised by the plurality of edges, the mask is defined by a list of labels of the plurality of labels associated with the sequence of nodes and the connecting edges.

Another exemplary embodiment of the disclosed subject matter is a computerized method comprising: obtaining a data structure representing a DNF representation of a set of values, the data structure comprises: a plurality of nodes, the plurality of nodes comprising a root and an at least one leaf; a plurality of edges connecting a first node and a second node of the plurality of nodes; a plurality of labels, each of the plurality of labels is associated with an element selected from the group consisting of a node comprised by the plurality of nodes and an edge comprised by the plurality of edges; wherein a route in the data structure starting in the node and ending in a leaf of the at least one leaf represents a mask; obtaining a new mask representing an at least one value; adding the new mask to the data structure by iterating over a portion of the plurality of nodes, the iterating over a portion of the plurality of nodes is performed by a processor, the iterating over a portion of the plurality of nodes comprising: traversing over an edge associated with a first label associated with a first portion of the new mask; traversing over a node associated with a second label associated with a second portion of the new mask; and adding a new edge associated to a third label and a new node associated to a fourth label, the new edge connects the new node and an old node, the third and fourth labels are associated with a third portion of the new mask, whereby a route from the root to the new node represents the new mask; and whereby the data structure is transformed to additionally include a representation of the at least one value.

Yet another exemplary embodiment of the disclosed subject matter is a computerized apparatus comprising: a processor; a first interface for obtaining a data structure representing a DNF representation of a set of values, the data structure comprises: a plurality of nodes, the plurality of nodes comprising a root and an at least one leaf; a plurality of edges connecting a first node and a second node of the plurality of nodes; a plurality of labels, each of the plurality of labels is associated with an element selected from the group consisting of a node comprised by the plurality of nodes and an edge comprised by the plurality of edges; wherein a route in the data structure starting in the node and ending in a leaf of the at least one leaf represents a mask; a second interface for obtaining a new mask representing an at least one value; a mask inserter configured to insert the new mask to the data structure, the mask inserter comprising: a node iterator configured to iterate over a node of the data structure in accordance with the new mask, a first label associated to a node and a second label associated with an edge connected to the node; a node inserter configured to add a new edge associated to a third label and a new node associated to a fourth label, the new edge connects the new node and an old node, the third and fourth labels are associated with a third portion of the new mask.

Yet another exemplary embodiment of the disclosed subject matter is A computer program product comprising: a computer readable medium; a first program instruction for obtaining a data structure representing a DNF representation of a set of values, the data structure comprises: a plurality of nodes, the plurality of nodes comprising a root and an at least one leaf; a plurality of edges connecting a first node and a second node of the plurality of nodes; a plurality of labels, each of the plurality of labels is associated with an element selected from the group consisting of a node comprised by the plurality of nodes and an edge comprised by the plurality of edges; wherein a route in the data structure starting in the node and ending in a leaf of the at least one leaf represents a mask; a second program instruction for obtaining a new mask representing an at least one value; a third program instruction for adding the new mask to the data structure by iterating over a portion of the plurality of nodes, third program instruction comprising: a fourth program instruction for traversing over an edge associated with a first label associated with a first portion of the new mask; a fifth program instruction for traversing over a node associated with a second label associated with a second portion of the new mask; and a sixth program instruction for adding a new edge associated to a third label and a new node associated to a fourth label, the new edge connects the new node and an old node, the third and fourth labels are associated with a third portion of the new mask, wherein the first, second, third, fourth, fifth, and sixth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is representing a set of values. Another technical problem dealt with by the disclosed subject matter is representing a set of values limited by one or more constraints. Yet another technical problem dealt with by the disclosed subject matter is to provide a relatively efficient data structure, in respect to memory, time and the like. Yet another technical problem is to provide a data structure optimized for testing, hardware synthesis, design, or other similar techniques that utilize a CSP solver.

One technical solution is to provide a data structure comprised of nodes and edges representing a DNF representation of the set of values. The data structure may comprise labels associated with a node or an edge such that a route in the data structure represents a mask associated with the DNF representation. Another technical solution is to provide a label utilizing ternary logic representation or other similar representations. Yet another technical solution is to associate the label with an edge, such that the edge may represent a "don't care" value or another similar grouping of different alternative values. Yet another technical solution is to verify that there are no two masks in the data structure that subsume one another. Yet another technical solution is to avoid inserting a mask if a counterpart mask is comprised by the data structure. Yet another technical solution is to insert a new mask representing both the counterpart mask and the mask to the data structure instead of the counterpart mask.

One technical effect of utilizing the disclosed subject matter is providing a data structure maintains an invariant that the data structure does not comprise two masks that subsume one another. Another technical effect of utilizing the disclosed subject matter is providing a data structure that maintains an invariant that the data structure does not comprise two masks which are counterparts of one another. Yet another technical effect is representing a mask by a list of labels associated with a route in the data structure. Yet another technical effect is having a data structure comprising a first value and a second value having a same prefix, a route that is associated with the same prefix in respect to the first value is not necessarily also associated with the same prefix in respect to the second value.

Figure 1:
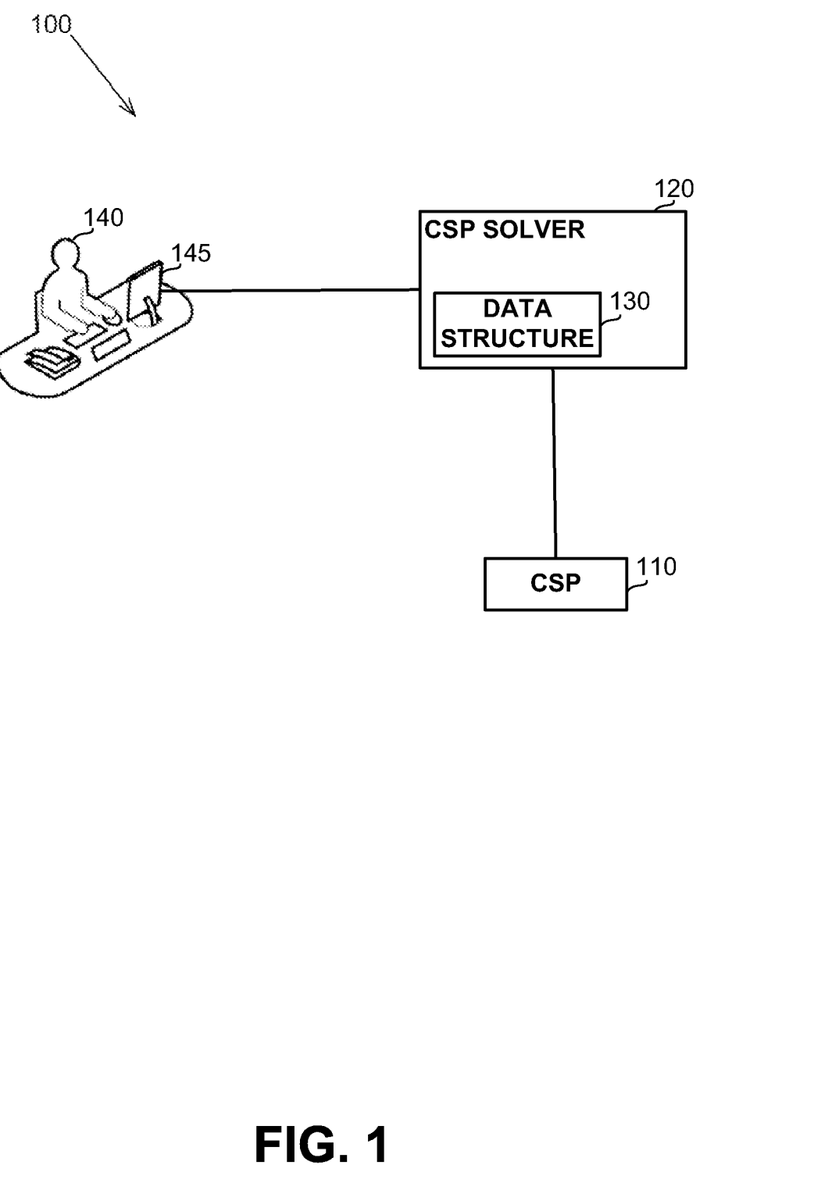
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 may comprise a CSP 110 and a CSP Solver 120. The CSP 110 may comprise a definition of one or more variables and a set of one or more constraints. The CSP 110 may further comprise one or more domains. Each of the one or more variables may be associated with a domain of the one or more domains. A domain may define a set of possible values which may be assigned to a variable. An exemplary domain may be a group comprising the values one, ten, fifty five and sixty six. In some exemplary embodiments, the one or more variables may be binary variables. In some exemplary embodiments, the domains may be represented in base-X number system domain. In some exemplary embodiments X is a predetermined number. For example, the base-X number system domain may be a base-2 number system domain (Binary domain), a base-8 number system domain (Octal domain) or the like. A base-X number system domain may represent a value using a set of digits, each having a range of X values, such as between zero and X−1. It will be noted that in some exemplary embodiment, some of the constraints may be propagated (fully or partially) into the respective domains. For example, in case X is defined as being smaller than Y, where Y is defined in the domain {1,2,3}, a respective domain for the variable X may not comprise any value bigger than two, because for all possible values of Y, X must be smaller than three. In some exemplary embodiments, each of the digits of a number may be represented by a different base. For example, in one exemplary embodiment, a first digit may be an octal digit, a second digit may be an hexadecimal digit, a third digit may be a binary digit and a fourt digit may be an octal digit.

In an exemplary embodiment, the CSP 110 may represent a test template associated with a target computerized system. The CSP Solver 120 may be utilized by a test generator (not shown) to generator a test based on the test template.

The CSP Solver 120 may be a computerized device configured to determine an assignments to the variables defined in the CSP 110 that hold the constraints. The assignments may be within the respective domains.

In some exemplary embodiments of the disclosed subject matter, the computerized environment 100 may comprise a user 140 utilizing a terminal 145 to interact with the CSP Solver 120. The user 140 may be a quality assurance engineer or the like, utilizing the test generator to test the target computerized system. The user 140 may access a product of the CSP solver 120 such as for example a satisfying assignment or a test generated based on the test template.

In some exemplary embodiments, the CSP Solver 120 may comprise a data structure 130. The data structure 130 may be utilized to represent the domains defined by the CSP 110. The data structure 130 may represent the domains before or after a portion of the constraints were propagated to the domains.

In some exemplary embodiments, the data structure 130 may represent a domain using a DNF representation. A DNF representation is a disjunction of terms. A term is a conjunction of one or more literals. a literal is a value associated with a digit of the variable. For example, in a binary domain of four bit integers, a value is defined using four digits $d\_1$, $d\_2$, $d\_3$ and $d\_4$. It will be noted that an indexing is associated with a predetermined order between digits which may be any predetermined order. For simplicity, we demonstrate the disclosed subject matter using a sequential order starting with the MSB and ending in the LSB. A literal $d\_1$ may represent that the digit $d\_1$ has a value of one. A literal $!d\_1$ may represent that the digit $d\_2$ has a value of zero. A term ($d\_1$, $d\_4$) may represent that the value may be any value amongst selected from: 1001, 1101, 1111, and 1011. A DNF represents that a value may be any value that is represented by any of the terms comprised by the DNF. For example, the DNF [($d\_1$, $d\_4$), ($d\_1$, $d\_3$, $!d\_4$), ($!d\_1$, $d\_2$, $d\_4$)] may represent any value that is represented by any of the three terms it comprises. It will be noted that a DNF representation may be useful for propagating constraints associated with predetermined digits (also referred to as bits) such as bitwise operations.

A mask may represent a term of a DNF. A mask may be a list of values to digits. For example, in a 32 bit domain, a mask may comprise a list of 32 values to each digit. A value may be an alternative value or a unique value. A unique value may be zero or one for the binary domain. An alternative value may be a "don't care" value for the binary domain. The "don't care" value is any valid value, such as a zero and a one in a binary domain. For example, a mask 1XX1 may represent the term ($d\_1$, $d\_4$), while the mask 01X1 may represent the term ($!d\_1$, $d\_2$, $d\_4$).

Figure 2A:
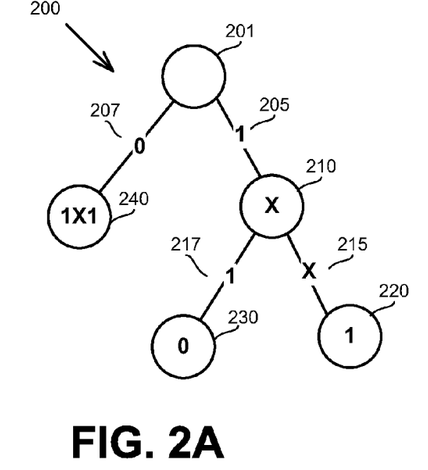
FIGS. 2A, 2B and 2C show a data structure in accordance with some exemplary embodiments of the disclosed subject matter.

Referring now to FIG. 2A showing a data structure in accordance with some exemplary embodiments of the disclosed subject matter. A data structure 200, such as the data structure 130 of FIG. 1, may represent the aforementioned DNF. The data structure 200 comprises nodes 201, 210, 220, 230, 240 and edges 205, 207, 215, 217. An edge connects two nodes, such as for example the edge 205 connects the node 201 with node 210. It will be noted that in some exemplary embodiments the edges may be directed or undirected. An edge may be labeled, such as for example the edge 205 is labeled by a value one. An edge may be labeled by a label representing an alternative assignment, such as for example the edge 215 is labeled by X, which represents a "don't care" value. A node may be labeled by a label representing a value of one or more digits. The node 240 is labeled by 1X1, which represent a value of one, a "don't care" and a value of one. In some exemplary embodiments, a node may not have any label, such as the node 201.

In some exemplary embodiments, the data structure 200 may comprise a directed acyclic graph (DAG). In some exemplary embodiments, the data structure 200 may comprise a tree.

A node that has no outgoing edges, such as the nodes 220, 230, 240, may be also referred to as a leaf. In case the data structure 200 is a tree, a leaf is a node which has only a parent node.

A node that has no incoming edges, such as the node 201, may also be referred to as a root.

A route in the data structure 200 may be defined between a first node and a second node, such as for example between a root and a leaf. For example, an exemplary route is a route between the node 201 and the node 220. The route may comprise a sequence of edges and nodes. In the exemplary route, the sequence may be the node 201, the edge 205, the node 210, the edge 215, the node 220. A route may represent a mask, such as defined by labels associated with edges and nodes in the sequence. For example the exemplary route may represent the mask 1XX1. A value in a label is associated with a predetermined digit, based on a placement of the label with the sequence and number of values in previous label. For example, the label associated with the edge 215 is associated with the third digit, as the edge 215 is after the edge 205 which has a label of a single digit and the node 210 which has a label of a single digit.

In some exemplary embodiments, the data structure 200 may hold an invariant that it does not represent two different masks that comprise one another. For example, the data structure 200 may not further comprise a representation of the mask 1X01 as that mask is comprised by the mask 1XX1 which is already comprised by the data structure 200.

In some exemplary embodiments, the data structure 200 may hold an invariant that it does not represent two different masks that are counterparts of one another. Two masks may be counterparts of one another if the unification of the two masks may be represented by a third mask. For example in a Binary domain, two masks may be counterparts in case every value associated to a digit by a first mask is the same as a second mask, except for one digit, and in respect to the one digit the values are opposite. For example, a mask 1XX1 and a mask 1XX0 are counterparts, as their unification may be represented by the mask 1XXX.

Figure 2B:
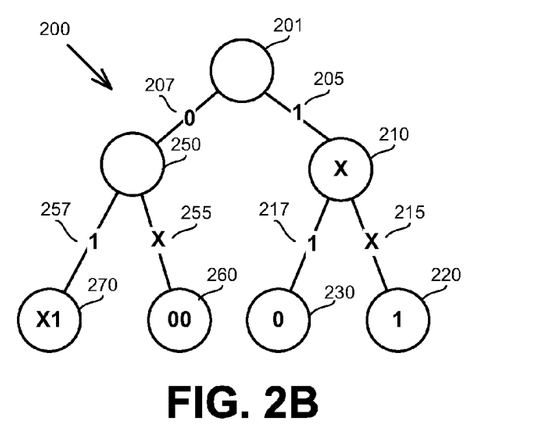

Referring now to FIG. 2B showing a data structure in accordance with some exemplary embodiments of the disclosed subject matter. The data structure 200 as shown in FIG. 2A may be modified by an addition of a new mask 0X00. The edge 207 is connected to the node 201, which is the root, and is labeled by zero, which corresponds to a value of the first digit according to the new mask. The node 240 of FIG. 2A is labeled by digits that do not correspond to the values set by the new mask. Therefore, the node 240 may be modified to node 270. A node 250 is inserted, connected to the edge 207. The node 270 may not be labeled, as a first digit according to the label of node 240 does not correspond to a value of the second digit according to the new mask. An edge 257, labeled by zero is inserted to connect between nodes 250 and 270. The route between the node 201 to the node 207 represents the mask 01X1, which was previously represented by the route between the node 201 and the node 240. A node 260 is inserted and is connected to node 250 using an edge 255. The edge 255 is labeled with X and the node 260 is labeled with two consecutive zeros. It will be noted that the data structure 200 in FIG. 2B corresponds to a DNF representing a DNF represented in the data structure 200 of FIG. 2A and an additional term (!d_1, !d_3, !d_4).

Figure 2C:
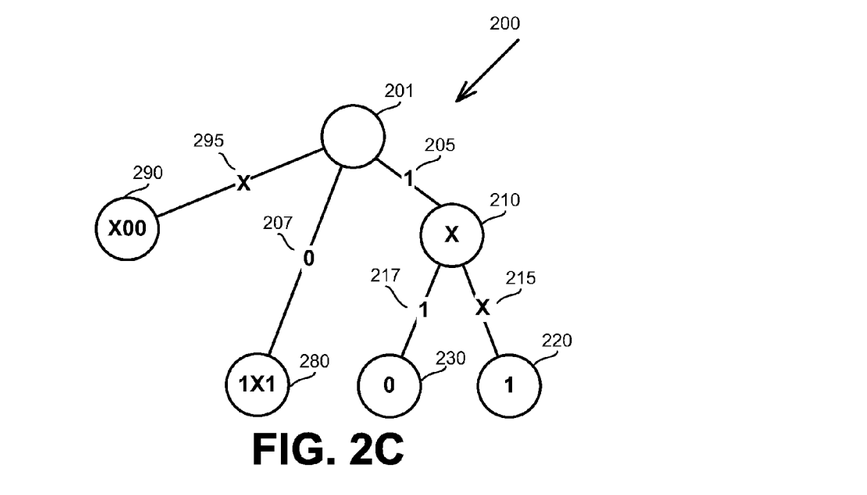

Referring now to FIG. 2C showing a data structure in accordance with some exemplary embodiments of the disclosed subject matter. The data structure 200 as shown in FIG. 2B may be modified by an addition of a new mask 1X00, corresponding to a term (d_1, !d_3, !d_4). The new mask is a counterpart of a mask 0X00 represented by a route between the nodes 201 and 270 in FIG. 2B. Therefore, the data structure 200 may be modified by removing that route and adding a father mask XX00 instead. A route from the root to the node 280 may represent the mask 01X1, in a similar manner to a route from the root to the node 240 of FIG. 2A. The node 290 may be connected to the node 201 by an edge 295. The edge 295 may be labeled by an X representing a "don't care". The node 290 may be labeled by a X00 label. A route between the root (the node 201) to the node 290 represents the father mask XX00.

In some exemplary embodiments, the data structure 200 may represent two values, such as 1100 and 1111, having a same prefix, such as a prefix "1". The two values are represented using two masks. The prefix may be represented by a different route in the data structure 200. For example, a route from the node 201 through the edge 295 represents (amongst others) the prefix 1 of the value 1100, whereas the route from the node 201 through the edge 220 represents the prefix 1 of the value 1111.

In some exemplary embodiments, the data structure 200 may represent a portion of a mask using a label associated with an edge, such as the edge 205. In some exemplary embodiments, the label may define alternative values, such as for example using a "don't care" value in a Binary domain. In some exemplary embodiments, a base-10 number system domain may be utilized. An alternative values may be grouped together, for example ODD may be a symbol representing possible odd values (i.e., 1,3,5,7,9). It will be noted that a predetermined set of values may be grouped and referred to by the label.

Figure 3:
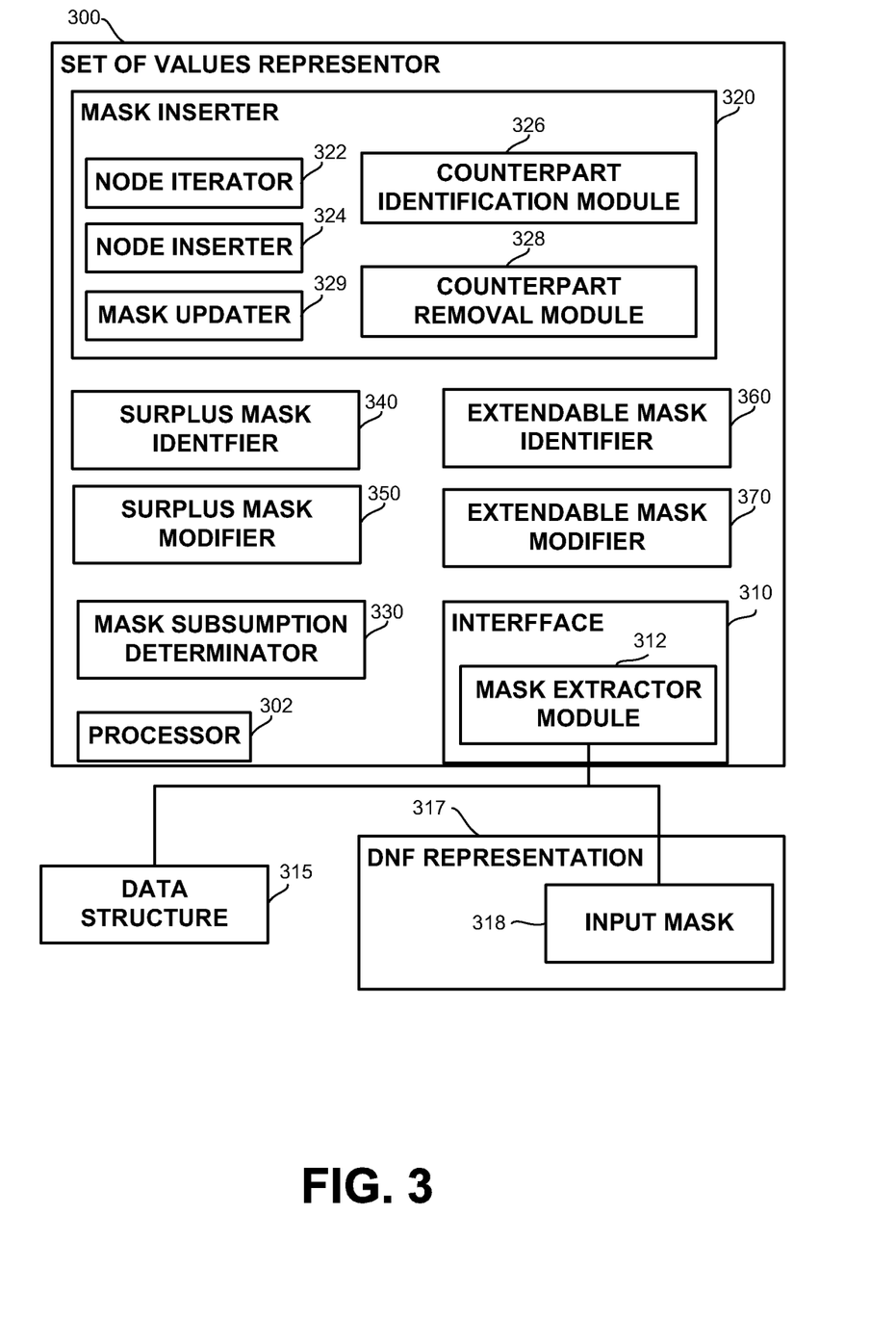
FIG. 3 shows a block diagram of a data structure manipulator in accordance with some exemplary embodiments of the disclosed subject matter.

Referring now to FIG. 3 showing a block diagram of a data structure manipulator in accordance with some exemplary embodiments of the disclosed subject matter. A data structure manipulator 300 may comprise a processor 302, an interface 310 and a mask inserter 320. The data structure manipulator 300 may be utilized to modify a data structure 315, such as 200 of FIG. 2A, to include an additional mask, term, value or the like. In some exemplary embodiments, a data structure manipulator may comprise a mask remover (not shown) in addition or instead of the mask inserter 320, enabling the data structure manipulator 300 to modify the data structure 315 such that it will no longer include a mask, term, value or the like.

The data structure 315 may comprise a plurality of nodes, including a root and one or more leafs. The data structure 315 may comprise a plurality of edges connecting a portion of the nodes. The data structure 315 may comprise labels associated with either a node, an edge or a similar element. A route in the data structure 315 may represent a mask. The route may start in the root. The route may end in a leaf. In some exemplary embodiments, the route may start in another predetermined element, such as an immediate successor of the root, a predetermined edge or the like.

The interface 310 may be configured to retrieve, receive or otherwise obtain the data structure 315, such as the data structure 200 of FIG. 2A. In some exemplary embodiments, the interface 310 may retrieve, receive or otherwise obtain an input mask 318. The input mask 318 may be a mask representing a set of one or more values to be added to the data structure 315, such as for example a mask 0X00 which may be added to the data structure 200 of FIG. 2A. In some exemplary embodiments, the interface 310 may be implemented as two separate interfaces (not shown) or as a single interface. The interface 310 may be, for example, an Application Programming Interface (API) utilized to obtain the data structure 315 or the input mask 318.

In some exemplary embodiments, the interface 310 is configured to determine the input mask 318 based on one or more values (not shown). In some exemplary embodiments of the disclosed subject matter, the input mask 318 may be comprised by a DNF representation 317. For example, the input mask 318 may be represented by a term in the DNF representation 317.

In some exemplary embodiments, the interface 310 may comprise a mask extractor module 312 configured to extract the input mask 318 from the DNF representation 317. The mask extractor module 312 may determine a mask represented by a term in the DNF representation 317. The mask extractor 312 may identify a literal in the term with a value of a digit in the input mask 318. The mask extractor 312 may identify an absence of a literal associated with a variable in the term and determine a "don't care" value with an associated digit.

In some exemplary embodiments, the mask inserter 320 may be configured to insert the input mask 318 to the data structure 315. The mask inserter 320 may transform the data structure 315 to further include one or more values represented by the input mask 318.

In some exemplary embodiments, the mask inserter 320 may comprise a node iterator 322. The node iterator 322 may be configured to iterate over nodes of the data structure 315. The node iterator 322 may be configured to iterate over the nodes in accordance with the input mask 318. The node iterator 322 may iterator from a first node to a second node only if a label associated with an edge connecting between the two nodes is in line with an appropriate portion of the input mask 318. The node iterator 322 may iterate from the first node to the second node only if a label associated with the second node is in line with an appropriate portion of the input mask 318. The node iterator 322 may be configured to start iterating from a root of the data structure 315.

In some exemplary embodiments, the mask inserter 320 may comprise a node inserter 324. The node inserter 324 may be configured to add a new edge to the data structure 315. The new edge may connect an existing node of the data structure 351 with a new node. The new node and the new edge may be utilized to be an ending of a route associated with the input mask 318 in the data structure 315. The node inserter 324 may further add to the data structure 315 labels associated with the new edge and/or the new node. It will be noted that the node inserter 324 may reuse portions of the data structure 315, such as for example the new node may be already comprised by the data structure 315 not connected with the existing node. Additionally, in some exemplary embodiments, flyweight design patterns may be utilized to decrease or minimize memory usage. For example, a label may be associated with more than one edge, node or other similar element. For example, referring back to FIG. 2B, the edge 205 and the edge 217 and the node 220 may all be associated with a single label indicating the value "1".

In some exemplary embodiments, the mask inserter 320 may comprise a counterpart identification module 326. The counterpart identification module 326 may be configured to identify a route in the data structure 315 representing a counterpart mask of the input mask 318. The counterpart identification module 326 may iterate over the data structure 315 in a path which is in line with all digits of the input mask 318 except one digit. In regards to the one digit, the counterpart identification module 326 may iterate over an edge, a node or another similar element of the data structure 315 which is associated with assigning an opposite value of to the one digit than that is set by the input mask 318. For example, referring back to FIG. 2B, a route comprising the nodes 201, 250 and 260 represents a counterpart mask 0X00 to the mask 1X00. The counterpart identification module 326 may iterate over the route as each value assigned to a digit represented by the labels associated with the route is in line with the mask except for one digit (i.e., the first digit is assigned a different value, the second digit is assigned the same value, "x", the third digit is assigned the same value "0", the fourth digit is assigned the same value "0"). Additionally, the value of the one digit is opposite to that assigned by the mask (i.e., the value in the mask for the first digit is "1", whereas the route represents assigning a value of "0" to the second digit). In some exemplary embodiments, the different value represented by the route may be any value, including a group of alternative values, which together with the value according to the mask may be represented by a grouping of values. For example, in a base-4 number system domain, a value of "0" and a different value of "2", may be represented together using a grouping of even numbers. In a base-2 number system domain, an only grouping is a "don't care" value which allows for the two possible values of a digit: 0 and 1. It will be noted that two counterpart masks may be represented by a mask consisting of the values represented by the two counterpart masks and only those values.

In some exemplary embodiments, the mask inserter 320 may comprise a counterpart removal module 328. The counterpart removal module 328 may be configured to remove a mask from the data structure 315, such as for example a counterpart mask identified by the counterpart identification module 326.

In some exemplary embodiments, the mask inserter 320 may comprise a mask updater 329. The mask updater 329 may be configured to update the input mask 318 to further consist the values represented by the counterpart mask. For example, in case the input mask is X01X and a counterpart mask X00X is comprised by the data structure 315, the mask updater 329 may be configured to update the input mask 318 to be X0XX.

In some exemplary embodiments, the counterpart identification module 326 may be utilized to identify a counterpart mask of the input mask 318, as updated by the mask updater 329. In some exemplary embodiments, the counterpart identification module 326, the counterpart removal module 328 and the mask updater 329 may be utilized iteratively.

In some exemplary embodiments, the data structure manipulator 300 may comprise a mask subsumption determinator 330. The mask subsumption determinator 330 may determine whether a mask, also referred to as a subsumed mask, is subsumed by a second mask, also referred to as a subsuming mask, comprised in the data structure 315. For example, referring back to FIG. 2A, the mask 10X1 may be subsumed by the mask 1XX1 which is represented by the route of the nodes 201, 210, 220 in the data structure 200. The mask subsumption determinator 330 may iterate over the nodes and edges of the data structure 315 as long as any associated label comprises at least the values represented by the subsumed mask.

In some exemplary embodiments, the data structure manipulator 300 may comprise a surplus mask identifier 340. The surplus mask identifier 340 may identify a surplus mask in the data structure 315. A surplus mask may be a mask representing at least a first value and a second value, wherein the first value is represented by another mask which is comprised by the data structure 315. For example, the data structure 315 may consist of the masks X0, 0X and 11. While the data structure 315 is in line with the aforementioned invariants, it may include a surplus mask. For example the value 00 is represented by both the masks X0 and 0X, therefore they may be considered as surplus masks. The surplus mask identifier 340 may determine whether a mask, associated with a first route in the data structure 315, is a surplus mask. The surplus mask identifier 340 may iterate over other routes of the data structure 315 to locate a route which almost subsumes the mask. For example, a mask 1X0X1 is almost subsumed by X0XXX, as all digits of the almost subsumed mask except for the second digit represent at least the appropriate digit in the mask. The second digit in the mask is X whereas the almost subsumed mask provides only a value of 0 for that digit. Therefore, the mask may be considered a surplus mask and it may be modified to a new mask 110X1. The new mask is identical to the mask except for the second digit, for which it provides the value which prevented the almost subsuming mask to subsume the mask, i.e. the value 1. It will be noted that a data structure 315 consisting the masks 1X0X1 and X0XXX represents the same values represented by a data structure 315 consisting the masks 110X1 and X0XXX.

In some exemplary embodiments, the data structure manipulator 300 may further comprise a surplus mask modifier 350. The surplus mask modifier 350 may modify a surplus mask, such as identified by the surplus mask identifier 340 to represent fewer values than before without modifying the values represented by the data structure 315. Referring again to the aforementioned example, the surplus mask modifier 350 may modify the mask 1X0X1 to be the mask 110X1. In some exemplary embodiments, the surplus mask modifier 350 may split the mask 1X0X1 to two masks which together are counterparts which represent it (e.g., 110X1 and 100X1) and add one or both of them to the data structure 315 using the mask inserter 320 or another similar module.

In some exemplary embodiments, the data structure manipulator 300 may comprise an extendable mask identifier 360 or an extendable mask modifier 370 utilized in a similar manner to the surplus mask identifier 340 and/or the surplus mask modifier 350. An extendable mask is a mask which may be extended to include additional values without modifying the set of values represented by the data structure 315. For example, a mask 110X1 may be extended to also 10011 and 10001 in case the two values are already represented by another mask, such as X0XXX. The mask 110X1 may therefore be extended to the mask 1X0X1. It will be noted that after an extended mask is extended it may become a surplus mask and after a surplus mask is reduced it may become an extendable mask. The two modifications—extending and reducing masks—may be utilized to provide a better representation of the values by the data structure 315 in respect to memory usage, size of the data structure 315, access time and the like. For example the data structure 315 may consist of three masks 1X, X1 and 00. The disclosed subject matter may be utilized to modify the data structure 315 without modifying the set of values it represents such that the data structure 315 may consist a single mask XX. For example, the mask 1X may be reduced to the mask 10, as the value 11 is further represented by X1. The updated data structure may then be modified by identifying that the masks 10 and 00 are counterparts and therefore may be replaced by X0. The updated data structure may further be modified by identifying that the masks X0 and X1 are also counterparts and may be replaced by XX.

In some exemplary embodiments, the data structure manipulator 300 may comprise a processor 302. The processor 302 may be a Central Processing Unit (CPU), a microprocessor, an electronic circuit, an Integrated Circuit (IC) or the like. The processor 302 may be utilized to perform computations required by the data structure manipulator 300 or any of it subcomponents.

Figure 4:
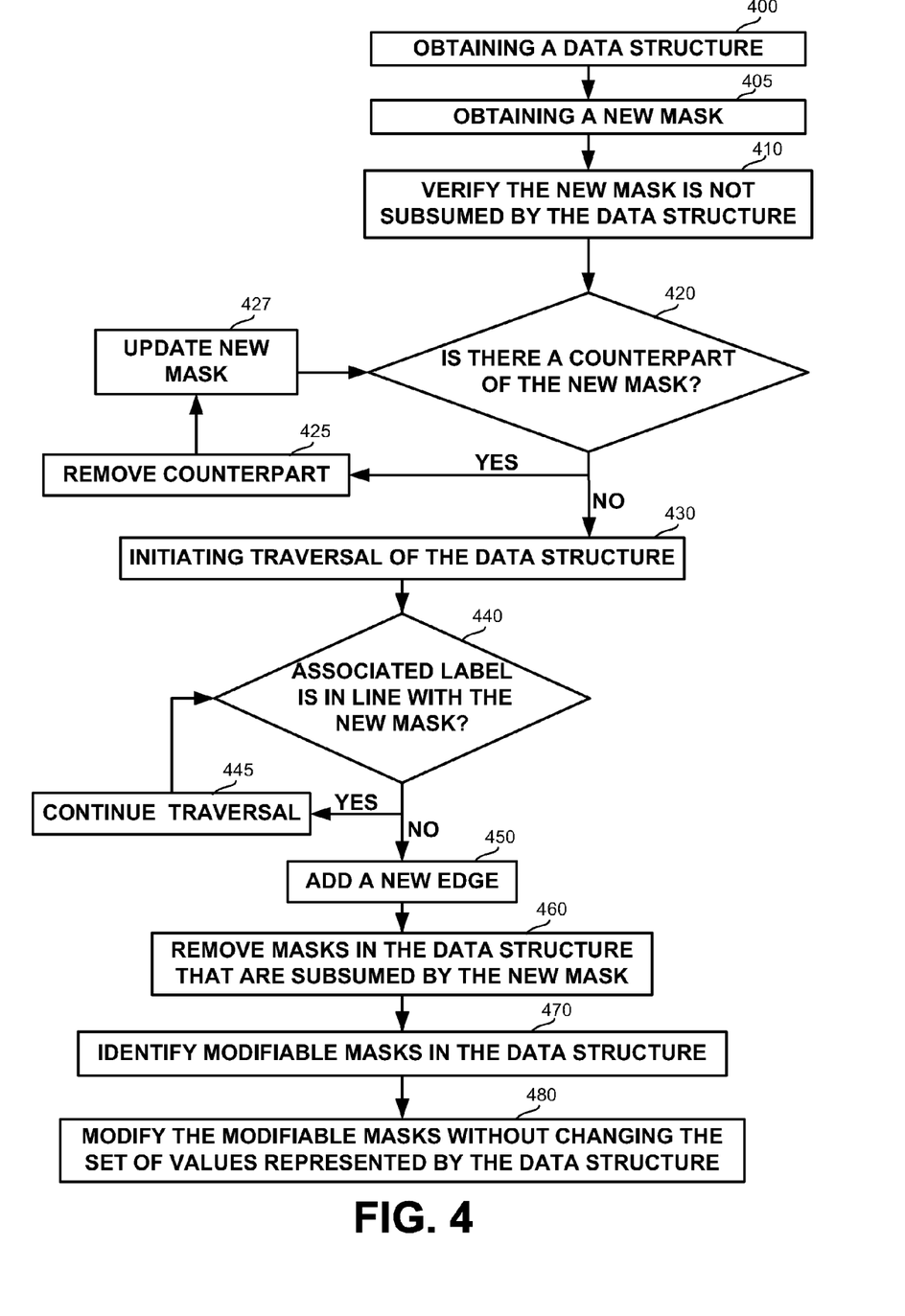
FIG. 4 shows a flowchart diagram of a method in accordance with some exemplary embodiments of the disclosed subject matter.

Referring now to FIG. 4 showing a flowchart diagram of a method in accordance with some exemplary embodiments of the disclosed subject matter.

In step 400, a data structure, such as 315 of FIG. 3, may be obtained. The data structure may be obtained by an interface, such as 310 of FIG. 3.

In step 405, a new mask, such as 318 of FIG. 3, may be obtained. The new mask may be obtained by an interface, such as 310 of FIG. 3. In some exemplary embodiments, the new mask is obtained from a DNF representation, such as for example the new mask may be obtained based on a term in the DNF representation.

In some exemplary embodiments, several new masks may be obtained, such as for example from a single DNF representation. The disclosed subject matter may be utilized iteratively on each of the new masks. In some exemplary embodiments, an order of applying the disclosed subject matter in respect to each new mask may be a predetermined order. For example, the new masks may be order based on alphanumerical order, a number of "don't care" values in each mask, a size of set of values being represented by each new mask, likelihood that the mask be a counterpart of another mask or the like.

In step 410, the data structure may be examined to verify that it does not comprise a mask that subsumes the new mask. The step 410 may be performed by a mask subsumption determinator, such as 330 of FIG. 3. In some exemplary embodiments, in case the new mask is determined to be subsumed, the method may end.

In step 420, a determination whether there is a counterpart of the new mask may be made. The determination may be performed by a counterpart identification module, such as 326 of FIG. 3.

In case there is a counterpart step 425 may be performed. In step 425 the counterpart may be removed from the data structure. The counterpart may be removed by a counterpart removal module, such as 328 of FIG. 3.

In step 427, the new mask may be updated to further include all the values represented by the counterpart mask. The new mask may be updated by a mask updater, such as 329 of FIG. 3.

In some exemplary embodiments, the updated new mask may be reexamined for counterparts in step 420. In other exemplary embodiments, step 430 may be performed without any additional iterations of step 420.

In step 430, traversal over the nodes and edges of the data structure may be initiated. The traversal may be performed by a node iterator, such as 322 of FIG. 3. The traversal may initiate in a predetermined node or edge, such as for example the root of the data structure.

In step 440, a label which is associated with a traversed element of the data structure, such as a node or edge, may be examined. The label may be examined to determine whether it is in line with appropriate portion of the new mask. For example, in case a prefix of the new mask has being associated with digits represented by other labels, the label is examined in respect to a portion of the new mask which is after the prefix. In case the label is the same as represented in the portion of the new mask, step 445 may be performed. Otherwise, step 450 may be performed.

In step 445, traversal of the data structure may continue. The traversal may be in accordance with the new mask, such as for example, in case several edges may be traversed an edge may be selected in accordance with the portion of the new mask In step 450, after discovering a digit represented by the new mask that is not represented in the data structure, a new edge may be added. The new edge may be added by a node inserter, such as 324 of FIG. 3. The new edge may connect a current node which was previously traversed to, and a new node. The new node may be also inserted. The new edge may be associated with a label in line with the portion of the new mask. In an exemplary embodiment, the first digit of the portion of the new mask is represented by the label associated with the new edge, whereas the rest of the digits are represented by the label associated with the new node. In some exemplary embodiments, a traversal may be prohibitied due to a portion of a label associated with a node, such as for example when referring to FIG. 2A and in case the new mask is 0X00, the node 240 prohibited traversal because of its associated label 1X1. In such a case, the node may be split to a two nodes which are connected by an edge. For example, the node 240 of FIG. 2A may have been split to the nodes 250 and 270 which are connected by the edge 257. The route from the node 250 to the node 270 is associated with labels which, when combined, are equivalent to the label associated with the node 240 of FIG. 2A.

In step 460, the data structure may be further inspected to determine whether other masks, which may be represented by routes in the data structure, are subsumed by the new mask. In case such other masks are discovered, they may be removed from the data structure.

In step 470, modifiable masks may be detected in the data structure. Modifiable masks may be either extendable masks or surplus masks. Step 470 may be performed by an extendable mask identifier, such as 360 of FIG. 3, and/or by a surplus mask identifier, such as 340 of FIG. 3.

In step 480, The modifiable masks may be modified without altering the set of values that are represented by the data structure. Step 480 may be performed by a surplus mask modifier, such as 350 of FIG. 3, and/or by an extendable mask modifier, such as 370 of FIG. 3. In some exemplary embodiments, step 480 may be implemented by removing the modifiable mask from the data structure and inserting a modified mask, such as for example by performing steps 410-460. It will be noted that there may be a need to add a conditional branch in order to avoid an infinite recursion.

In some exemplary embodiments, different heuristics may be utilized to determine whether to perform either of steps 470 and 480. Step 470 and 480 may be performed several times in respect to different masks. An order between the different masks may be a predetermined order determined by user input, command, rules, parameters or the like.

In some exemplary embodiments, the method of FIG. 4 may be performed by a CSP solver, such as 120 of FIG. 1. The CSP solver may utilize the data structure to represent a set of values efficiently. The CSP solver may utilize the disclosed subject matter to gain a speedup, a reduction in memory utilization or the like, due to some of the aspects of the disclosed subject matter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data structure comprising a Disjunctive Normal Form (DNF) representation of a set of values, the data structure embodied in a non-transitory computer-readable media, the data structure comprising:
   a plurality of nodes comprising a root and a leaf;
   a plurality of edges, each edge of the plurality of edges connecting two nodes of said plurality of nodes;
   a plurality of labels, each of the plurality of labels is associated with an element selected from the group consisting of a node that is comprised by said plurality of nodes and an edge that is comprised by said plurality of edges;
   wherein a first label of said plurality of labels includes a don't care symbol which represents a group of two or more alternative assignments to a digit; and
   wherein a route between the root and the leaf represents a mask that groups a portion of the set of values, the route comprises a sequence of nodes comprised by said plurality of nodes which are connected by connecting edges that are comprised by said plurality of edges, the mask is defined by a list of labels of said plurality of labels associated with the sequence of nodes and the connecting edges.

2. The data structure of claim 1, wherein:
the set of values is represented in a base-X number system domain, each value of the set of values is represented by an at least one digit; and
each label of the plurality of labels represents an at least one assignment to a portion of the at least one digit.

3. The data structure of claim 2, wherein the base-X number system domain is a base-2 number system domain.

4. The data structure of claim 3, wherein the at least one assignment is selected from the group consisting of zero, one and "don't care".

5. The data structure of claim 1, wherein the first label of said plurality of labels is associated with a first edge of said plurality of edges.

6. The data structure of claim 5, wherein a second label of said plurality of labels is associated with a second edge of said plurality of edges, both the first edge and the second edge are outgoing edges associated with one node of said plurality of edges, the second label represents at least a portion of the alternative assignments to the digit.

7. The data structure of claim 1, wherein the data structure is selected from a group consisting of a tree and a directed acyclic graph.

8. The data structure of claim 1, wherein a portion of said plurality of labels is selected from a group consisting of null entry and mask entry; the mask entry comprises an at least one digit having a value selected from the group consisting of zero, one and don't care.

9. A CSP solver comprising the data structure of claim 1.

10. The data structure of claim 1, wherein each route between the route and any leaf of the data structure represents a different mask which is determined based on labels associated with a respective sequence of nodes and connecting edges.

11. The data structure of claim 1, wherein the first label is associated with two or more digits.

12. The data structure of claim 11, wherein the don't care symbol is associated with one digit of the two or more digits.

* * * * *